United States Patent [19]

Nicholas et al.

[11] Patent Number: 5,224,833
[45] Date of Patent: Jul. 6, 1993

[54] FAN FOR A GAS TURBINE ENGINE AIR INTAKE

[75] Inventors: David J. Nicholas; Tony F. Mortimer, both of Derby, England

[73] Assignee: Rolls-Royce plc, London, England

[21] Appl. No.: 921,971

[22] Filed: Aug. 4, 1992

Related U.S. Application Data

[63] Continuation of Ser. No. 698,345, May 7, 1991, abandoned, which is a continuation-in-part of Ser. No. 459,305, Dec. 29, 1989, abandoned.

[30] Foreign Application Priority Data

Feb. 28, 1989 [GB] United Kingdom ................ 8904478

[51] Int. Cl.$^5$ ............................................. B64C 11/14
[52] U.S. Cl. ............................ 416/245 R; 415/218.1; 415/219.1
[58] Field of Search ........... 416/244 R, 244 A, 245 R; 415/182.1, 183, 208.1, 218.1, 219.1, 220, 914; 244/53 R, 53 B

[56] References Cited

U.S. PATENT DOCUMENTS

| | | | |
|---|---|---|---|
| 2,741,454 | 4/1956 | Eppley | 416/244 A X |
| 3,765,623 | 10/1973 | Donelson et al. | 244/53 B |
| 4,129,984 | 12/1978 | Nelson | 416/245 R X |
| 4,220,171 | 9/1980 | Ruehr et al. | |
| 4,308,718 | 1/1981 | Mowill | 415/207 X |
| 4,419,053 | 12/1983 | Swearinger, Jr. | 416/245 R X |
| 4,458,863 | 7/1984 | Smith | 244/53 B X |
| 4,699,568 | 10/1987 | Harlamert et al. | 416/245 R X |
| 4,790,725 | 12/1988 | Bousquet et al. | 416/245 R |

FOREIGN PATENT DOCUMENTS

| | | |
|---|---|---|
| 111785 | 6/1984 | European Pat. Off. . |
| 266263 | 4/1988 | European Pat. Off. . |
| 556910 | 3/1942 | United Kingdom . |
| 975892 | 6/1961 | United Kingdom . |
| 1524908 | 1/1976 | United Kingdom . |

OTHER PUBLICATIONS

B. H. Little, Jr., "Propulsion System Installation Design for High-Speed Prop-Fans", Journal of Aircraft, vol. 20 (1983) No. 5, pp. 411–417.

Teorija vozdushno-reaktivnyh dvigatelej, edited by S. M. Shljahtenko, m. mashinostroenie, 1974, p. 64.

G. S. Skubacevskij: Avicionnye gasoturbinnye dvigateli Konstrukcija-i- rascet detalej. M. Mashinostroenie, 1969, p. 7.

*Primary Examiner*—Edward K. Look
*Assistant Examiner*—James A. Larson
*Attorney, Agent, or Firm*—Cushman, Darby & Cushman

[57] ABSTRACT

A ducted fan gas turbine engine spinner is so configured so as to be generally outwardly flared at its downstream end. The flared portion provides a decrease in the local axial velocity of the air flow over the spinner. This in turn leads to the reduction or elimination of choking in the radially inner region of the fan of the engine.

5 Claims, 3 Drawing Sheets

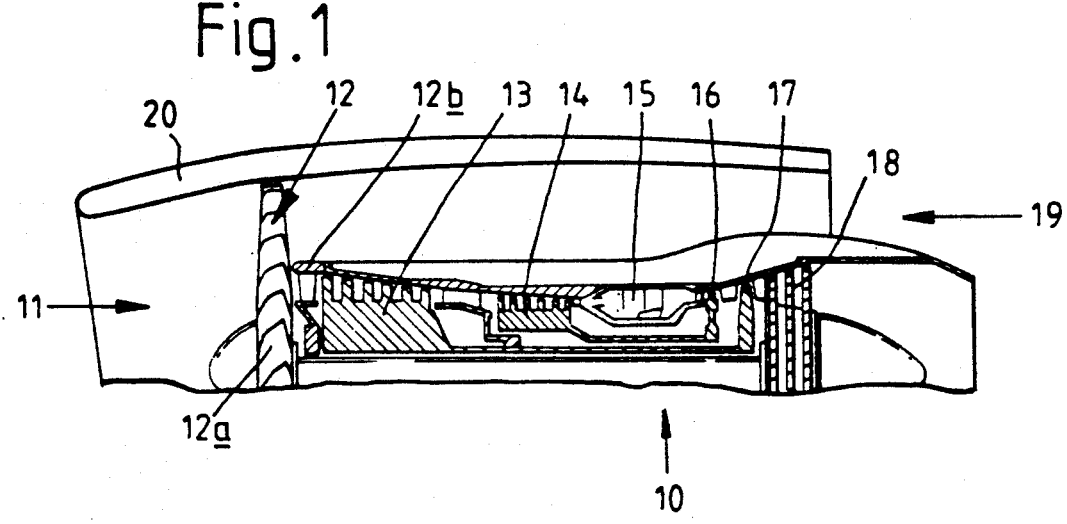
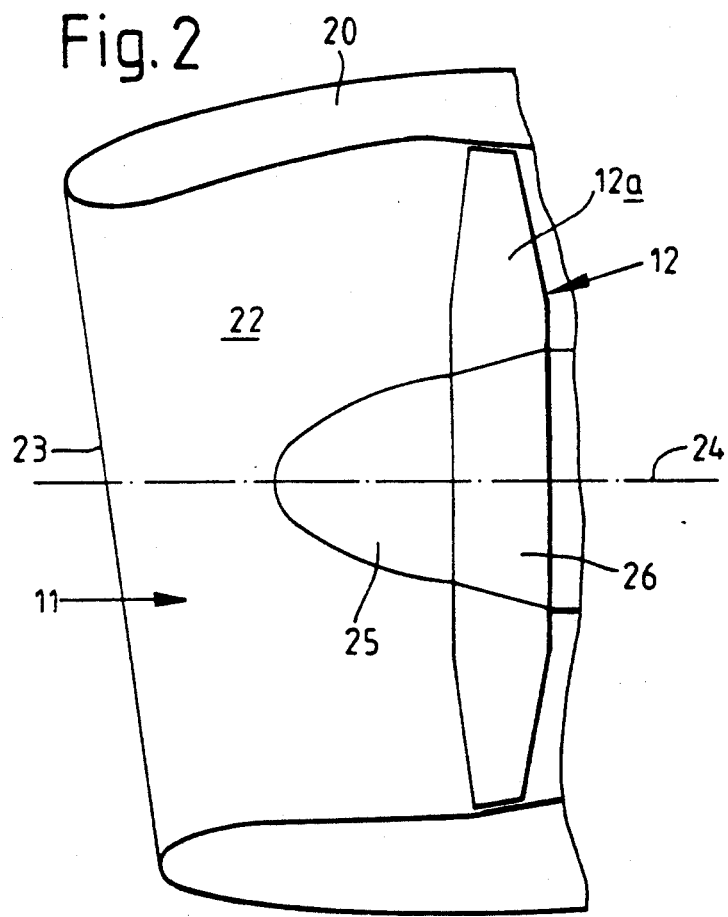

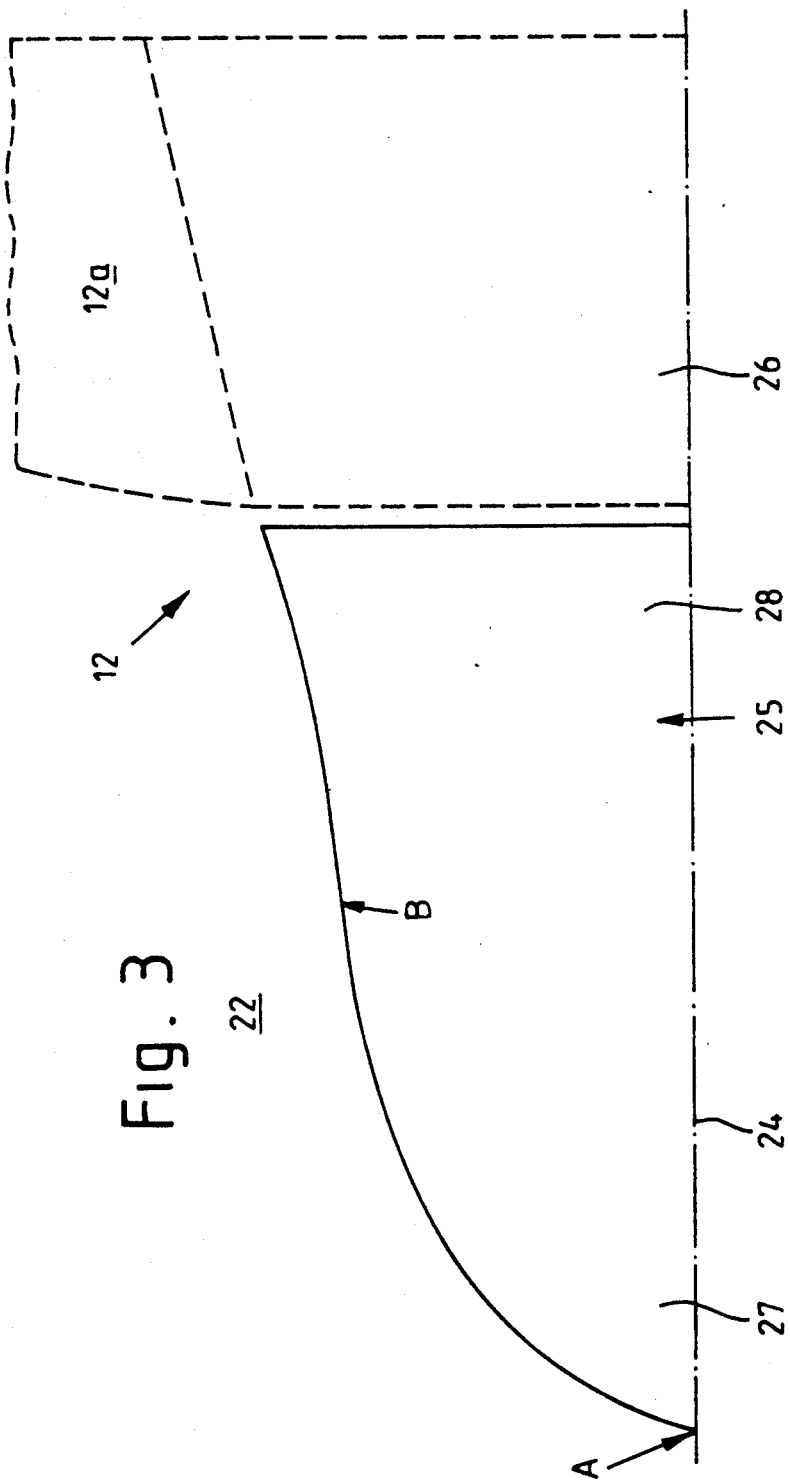

FAN FOR A GAS TURBINE ENGINE AIR INTAKE

This is a continuation of application Ser. No. 07/698,345, filed on May 7, 1991, now abandoned, which was a continuation-in-part of Ser. No. 07/459,305, filed on Dec. 29, 1989, which was abandoned.

This invention relates to a fan for a gas turbine engine air intake and is particularly concerned with the spinner of such a fan.

In the quest for improved efficiency and low specific fuel consumption, ducted fan gas turbine engines have been designed with fans which provide very high by-pass ratios.

Improvements in fan technology, for instance the introduction of wide chord fan blades, which have permitted the introduction of such high by-pass ratio engines, have meant that single stage fans, that is fans including a single rotatable annular array of fan blades, are now capable of coping with an air flow rate which is within 4 to 5% of the maximum rate which is theoretically attainable.

It has been found that when ducted fans operate at the very high air flow rates associated with modern high by-pass ratio ducted fan gas turbine engines, the region of the fan closest to its hub experiences adverse air flow conditions under conditions of high engine powers and high fan speeds which result in an undesirably large air pressure drop across the fan hub region. There are a number of reasons why this occurs, one of the most important of which is the degree of local internal streamline curvature of the fan duct immediately upstream of the fan blade tips. Typically the curvature, which is intended to provide a certain degree of air flow diffusion within the air intake, is such that axial velocity of the air flow in this region is reduced. This, however, has the effect of increasing the axial air flow velocity in the hub region, of the fan leading in turn to a certain degree of air flow choking in that region. The effect is compounded to a certain extent in the case of fan ducts having intake mouths which are configured so as to be downwardly inclined by several degrees relative to the engine axis. This is necessary in order for the intake to match the designed attitude of the aircraft powered by the engines.

The amount of modification to the aerodynamic profiles of the fan blades in their hub regions to counter such air flow choking is severely limited by constraints which are imposed by the fan blades themselves. For instance, the hub regions of the fan blades must be relatively thick in order to satisfy fan blade stress design criteria and provide aerodynamic stability.

It has been found that the large pressure reductions which have been encountered in the hub regions of fan blades have had adverse effects upon the operation of other parts of the engine. Thus it is air from the hub region of the fan which is subsequently directed into the core of the engine for passage through the usual gas turbine gas generator cycle. Consequently the compressors of the engine have not received their designed air flow at the correct pressure and this in turn has led to an undesirable increase in temperatures in the turbines of the engine and a decrease in overall engine operating efficiency.

It is an object of the present invention to ensure that such air flow choking in the region of the fan hub is reduced or substantially eliminated.

According to the present invention, a fan for the air intake of a ducted fan gas turbine engine comprises a hub having an upstream end and carrying an annular array of radially extending aerofoil blades and a spinner, said spinner comprising an axisymmetric body having an axis of revolution and an upstream end and a downstream end with respect to an operational flow of air thereover, said downstream end of said spinner being attached to the upstream end of said hub so as to be immediately upstream of said array of aerofoil blades and additionally so configured as to be generally radially outwardly flared with respect to said axis of revolution and with respect to the portion of said spinner immediately upstream of said radially outwardly flared portion thereof to an extent sufficient to reduce the local axial velocity of said air operationally flowing thereover immediately prior to said air flowing over the radially inward regions of said array of aerofoil blades.

The reduction in local axial flow velocity of air entering the radially inward regions of the aerofoil blade array ensures that the possibility of air flow choking in the fan hub is reduced.

The invention will now be described, by way of example, with reference to the accompanying drawings in which:

FIG. 1 is a sectioned side view of the upper half of a ducted fan gas turbine engine provided with a fan in accordance with the present invention.

FIG. 2 is an enlarged sectioned side view of the air intake of the ducted fan gas turbine engine shown in FIG. 1.

FIG. 3 is a schematic side view of the spinner of the ducted fan gas turbine engine shown in FIG. 1.

Figure 4:
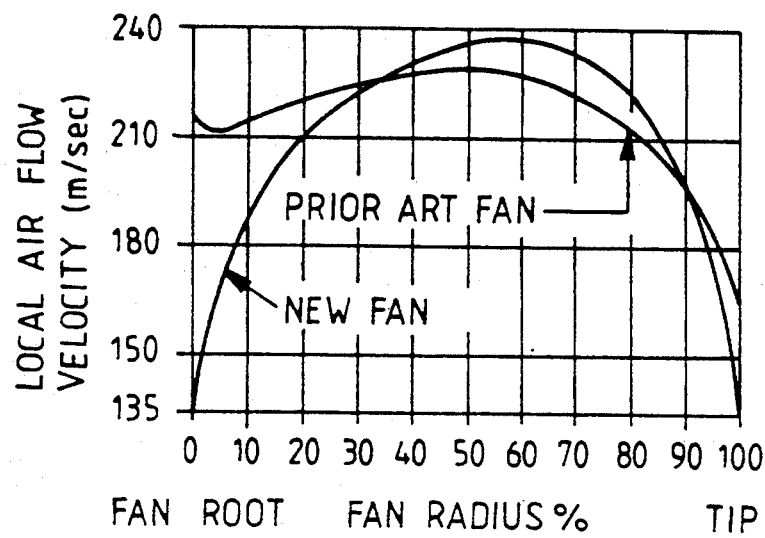
FIG. 4 is a graph indicating the relationship between the axial velocity of air entering the fan and the fan radius at which the air velocity is measured in respect of two ducted fan gas turbine engines: one having a fan which is in accordance with the present invention and one having a fan which is not in accordance with the present invention.

With reference to FIG. 1, a ducted fan gas turbine engine generally indicated at 10 is of conventional construction and comprises, in axial flow series, an air intake 11, a fan 12 comprising an annular array of radially extending fan blades 12a, an airflow splitter 12b, an intermediate pressure compressor 13, a high pressure compressor 14, combustion equipment 15, a high pressure turbine 16 drivingly connected to the high pressure compressor 14, an intermediate pressure compressor 17 drivingly connected to the intermediate pressure compressor 13, a low pressure compressor 18 drivingly connected to the fan 12 and a propulsion nozzle 19. The fan 12 and a major proportion of the engine 10 are enclosed by a fan casing 20 so that an annular fan duct 21 is defined between the engine 10 and casing 20.

The gas turbine engine 10 functions in the conventional manner whereby air entering the engine through its intake 11 is compressed by the fan 12. The splitter 12b ensures that part of the air flow exhausted from the fan 12 continues its passage through the fan duct 21 to ultimately provide propulsive thrust while the remainder is directed into the intermediate and high pressure compressors 13 and 14 where further compression takes place. The compressed air is mixed with fuel in the combustion equipment 15 and the mixture combusted. The resultant hot combustion products then expand through the high, intermediate and low pressure turbines 16,17 and 18 before being exhausted to atmosphere through the exhaust nozzle 19 where they mix with air exhausted from the fan duct 21 to provide propulsive thrust.

The fan casing 20 terminates some way upstream of the fan 12 as can be seen more easily if reference is made to FIG. 2. This is done so as to ensure that an enclosed region 22 is defined upstream of the fan 12 in which air entering the intake 11 is diffused prior to being acted upon by the fan 12. Diffusion is necessary to ensure that the velocity of the air is matched to the characteristics of the fan 12 and is achieved by ensuring that the cross-sectional area of the region 22 progressively increases in the direction of air flow as can be seen in the drawing. It will also be seen from FIG. 2 that the plane of the mouth 23 of the air intake 11 is downwardly inclined with respect to the axis of rotation 24 of the fan 12 so that in normal level flight of an aircraft powered by the engine 10 in which the aircraft adopts a slightly "nose-up" attitude, the plane of the intake mouth 23 is normal to the direction of flight. This inclination of the intake mouth 23 plane in the uppermost portions of the intake region 22 of the fan casing 20 having to be provided with a greater degree of internal curvature than the lower portions as can be clearly seen in FIG. 2 in order to provide the necessary air flow diffusion.

A further feature which facilitates the correct air flow into the fan 12 is a spinner 25 which is coaxially attached to, and therefore rotates with, the fan hub 26. The spinner 25 is an axisymmetric body which forms part of the fan 12 and is intended to facilitate a re-direction of the air flow through the central region of the intake over the radially inner regions of the fan blades 12a.

These features all contribute to a slowing down of the air flow in the radially outer reaches of the intake region 22 and this in turn leads to a corresponding acceleration of the air flow flowing over the spinner 25 and in turn over the radially inner regions of the fan blades 12a. Conventionally this can lead to the radially inner regions of the fan blades 12a being over-supplied with air which in turn leads to air flow choking in that fan 12 portion.

The present invention is directed to reducing or eliminating this choking of the radially inner portion of the fan 12 by the reduction of the local axial velocity of air flowing over the radially inward regions of the fan blades 12a. This is achieved by modifying the profile of the spinner 25 in a novel manner as can be seen more easily if reference is now made to FIG. 3.

The spinner 25 has upstream and downstream ends 27 and 28 respectively with respect to the flow of air through the air inlet portion 22. The downstream end 28 is of greatest diameter and is attached (by means not shown) to the upstream end of the fan hub 26. The portion of the spinner 25 extending from the upstream end 27 thereof may be of any convenient form such as conical but in this particular case is of generally elliptical cross-sectional shape in an axial sense from its most upstream point A to position B which is some way past the spinner axial mid position. The major axis of the ellipse is the axis of rotation 24 of the spinner 25. The effect of this spinner 25 configuration is to create a boundary layer of air flowing over the spinner 25 which has a local axial component of flow and which, by virtue of the elliptical cross-sectional shape of this portion of the spinner 25, is axially accelerated. This results in a reduction in the thickness of the boundary layer. However, as previously indicated, air passing over the radially inner regions of the fan blades 12a with a high axial velocity is undesirable. Consequently in order to reduce the axial velocity of this air flow, the downstream end 28 of the spinner 25, is curved in the opposite direction to that of the spinner 25 portion upstream of the position B. Thus the downstream end 28 of the spinner 25 is configured so as to be radially outwardly flared both with respect to the axis of rotation 24 of the spinner 25 and with respect to the portion of the spinner 25 which is upstream of the flared portion. The axial extent of the flared portion of the spinner 25 is so arranged as to be generally equal to the axial extent of the fan 12 in its hub region. The effect of this radially outward flaring of the downstream end 28 of the spinner 25 is to reduce the local axial velocity of the air flow over the spinner after its boundary layer thickness has been reduced and prior to it flowing over the radially inward regions of the fan blades 12a to an extent sufficient to reduce or eliminate the incidence of choking of the air flow in those regions.

Tests have been carried out using a ducted fan gas turbine engine 10 fitted with a fan 12 in accordance with the present invention, whereby the outward flaring begins at a position 50.7 cm rearward from the most upstream point A and 11 cm forward from the most downstream point of the spinner 25 with the radius of the spinner being 32 cm and 33.2 cm, respectively, at the position where outward flaring begins and the most downstream point of the spinner 25. In comparison to a similar ducted fan gas turbine provided with a conventional prior art fan with a conical spinner, it has been found that the local axial velocity of the air flow into the radially inner regions of the engine's fan blades 12a is reduced by 40% in the case of the engine provided with the fan 12 in accordance with the present invention compared with that of the engine provided with the conventional fan. This reduction in the local axial velocity of the air flow can be seen more clearly if reference is made to the graph shown in FIG. 4. It can be seen from the graph that in the radially inner root region of the fan in accordance with the present invention, the air flow velocity is considerably less than that in the case of the fan provided with the conventional prior art spinner. However at locations radially outwardly of the root region, the air flow velocities in both fans tend to be very similar. Clearly therefore the use of fans in accordance with the present invention does not result in detrimental air flow velocity effects at locations radially outwardly of the fan root region.

Figure 5:
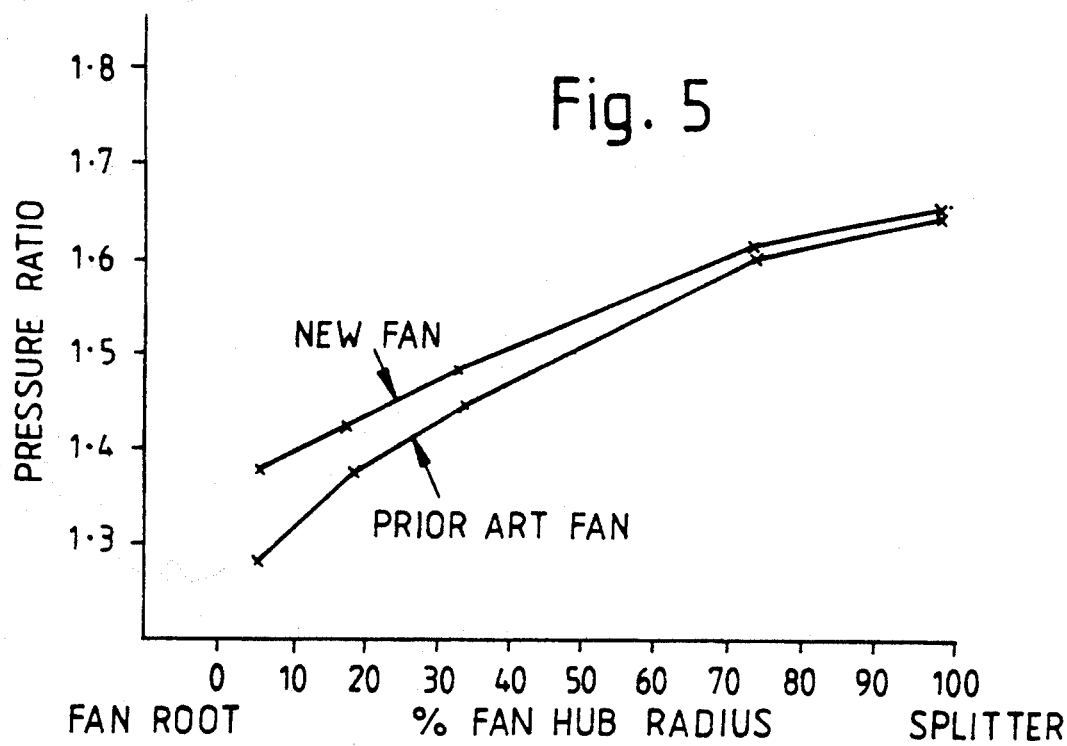
FIG. 5 is a graph indicating the relationship between the hub pressure ratio across the fan and the radius at which the pressure ratio is measured between the fan hub and the splitter downstream of the fan in respect of two ducted fan gas turbine engines: one having a fan which is in accordance with the present invention and one having a fan which is not in accordance with the present invention.

The graph shown in FIG. 5 indicates the desirable effect which the use of fans in accordance with the present invention has upon the pressure ratio across the fan 12. It will be seen that at locations at or near the radially inner root region of the fan 12 the pressure ratio across the fan 12 is significantly higher in the case of the fan in accordance with the present invention than it is with the conventional prior art fan.

It is clear from the above results that fans in accordance with the present invention are characterised by a significant improvement in performance in the radial inner regions of the fan. Thus we have found that the use of a ducted fan gas turbine engine having a fan in accordance with the present invention has, compared with the use of a conventional prior art fan on a similar engine, resulted in such improved radial pressure profile downstream of the fan. This in turn has resulted in more efficient operation of the intermediate pressure compressor of the engine and, as a consequence, gas temperatures within the engine's turbines have been reduced by 15°-20° C. and there have been improvements in specific fuel consumption under take-off and maximum climb conditions of between 1.3 and 2.5%.

Although the present invention has been described with reference to a fan 12 having a spinner 25, the downstream end 28 of which is outwardly curved so as to define the desired flare, it will be appreciated that a flare of frusto-conical form could in certain circumstances be utilised if so desired.

We claim:

1. A fan for the air intake of a ducted fan gas turbine engine, said fan comprising a hub having an upstream end, an annular array of radially extending aerofoil blades and a spinner, said hub carrying said radially extending aerofoil blades and spinner, said spinner comprising an axisymmetric body having an axis of revolution and an upstream end and a downstream end with respect to an operational flow of air thereover, said downstream end of said spinner being attached to the upstream end of said hub so as to be immediately upstream of said array of aerofoil blades and additionally so configured as to be generally radially outwardly flared with respect to said axis of revolution and with respect to the portion of said spinner immediately upstream of said radially outwardly flared portion thereof to reduce the local axial velocity of said air operationally flowing thereover immediately prior to said air flowing over the radially inward regions of said array of aerofoil blades, the axis of revolution of said spinner being coaxial with a longitudinal axis of said gas turbine engine, the axial extent of the flared portion of said spinner being generally equal to the axial extent of said fan in its hub region.

2. A fan as claimed in claim 1 wherein the axis of revolution of said spinner is coaxial with a longitudinal axis of said gas turbine engine.

3. A fan as claimed in claim 2 wherein said fan is located in a fan duct of said gas turbine engine defined by a fan casing, said fan casing extending upstream of said fan to define an air intake mouth which conducts air passing through said fan duct into said fan.

4. A fan as claimed in claim 3 wherein said air intake mouth lies in a plane which is downwardly inclined with respect to the longitudinal axis of said gas turbine engine.

5. A fan as in claim 1 wherein said outward flaring begins at a position 50.7 cm rearward from the upstream end of the spinner and 11 cm forward from the downstream end of the spinner with a radius of the spinner being 32 cm at the position where outward flaring begins and 33.2 cm at the downstream end.

* * * * *